United States Patent Office 3,637,565
Patented Jan. 25, 1972

3,637,565
LATEX COMPOSITIONS HAVING IMPROVED ADHESION
David P. Sheetz, Midland, Mich., assignor to The Dow Chemical Company, Midland, Mich.
No Drawing. Filed Nov. 30, 1964, Ser. No. 414,834
Int. Cl. C08f 45/34, 1/13
U.S. Cl. 260—29.6 TA                 5 Claims

ABSTRACT OF THE DISCLOSURE

Stable, cationic latices are prepared by emulsion polymerization at a pH value of below 7 of (1) (a) a primary or secondary amino alcohol ester of an $\alpha,\beta$-ethylenically unsaturated carboxylic acid and an $\alpha,\beta$-ethylenically unsaturated carboxylic acid or (b) a primary or secondary amino alcohol half ester of an $\alpha,\beta$-ethylenically unsaturated dicarboxylic acid with (2) at least one other polymerizable ethylenically unsaturated substantially water-insoluble monomer. To these cationic latices may be added a non-ionic surfactant and a base-acting material to raise the pH to a value greater than 8 to obtain anionic latices which have desirable adhesive properties and are compatible with conventional paint formulating ingredients.

---

This invention concerns an improved process and composition for aqueous emulsion polymerization to produce stable latexes. It particularly concerns the preparation of stable latexes which, when deposited and dried on a substrate, yield polymer films which adhere very tenaciously thereto.

In the well known art of emulsion polymerization a monomeric usually water insoluble liquid composition comprising a polymerizable ethylenically unsaturated compound such as styrene, butadiene, methyl methacrylate, ethyl acrylate, vinyl acetate, vinyl chloride or vinylidene chloride, or certain mixtures thereof, is colloidally emulsified in an aqueous medium that usually contains a wetting agent or surfactant, such as a water soluble alkali soap and a polymerization catalyst such as potassium persulfate. The resulting colloidal emulsion is then subjected to conditions conducive to polymerization of the monomeric constituents to produce an aqueous colloidal dispersion of the corresponding polymeric product; the aqueous colloidal dispersion being commonly called a latex. The stability of the resulting polymer latex against coagulation or precipitation of the polymer ingredient depends at least in part upon the kind and amount of surfactants and the like that are contained in the aqueous suspending medium. In some instances the stability of the latex can be improved by adding further amounts of surfactants or other stabilizers to the colloidal dispersion after completion of the polymerization step. However, latexes stabilized only with external surfactants are stabilized only to a limited degree and are more or less vulnerable to external destabilization.

In U.S. Pat. 3,108,979 there is described a composition for aqueous emulsion polymerization of polymerizable ethylenically unsaturated compounds to obtain very stable aqueous colloidal dispersions of polymer by the use of amino alcohol esters as cationic monomers. Such a process provides stable polymer dispersions that contain only small proportions of water soluble constituents. In a co-pending application of Walter J. Le Fevre and David P. Sheetz, Ser. No. 300,671 filed Aug. 7, 1963, there are described a process and composition using amino alcohol esters as cationic comonomeric stabilizers but also requiring a non-polymerizable conventional cationic surfactant having a molecular weight less than about 500 in an amount inherently insufficient to provide a stable emulsion. The resulting dispersions are very stable although the amount of art recognized surfactant is too low to provide emulsion stability and even though such amino alcohol esters are not emulsifiers. Such products are sufficiently colloidally stable that addition of post polymerization stabilizers usually is unnecessary. The products from both of the above processes, however, are cationic latexes. While such latexes have very advantageous properties for many uses, it is highly advantageous, and sometimes required, that the latex should be anionic, for example, in order to be compatible with conventionally used aqueous pigment dispersions. It is especially desired to have an anionic latex which when deposited on polar substrates and dried provides a film which has improved adhesion to such substrate.

It has been discovered, and this discovery is the subject of this invention, that stable latexes which provide water insoluble films when deposited on polar substrates and which have improved adhesion thereto are obtained by subjecting to conditions conducive to vinyl emulsion polymerization at a pH less than about 7, preferably less than about 3.5, a mixture containing the polymerizable components: (1) a substantially water insoluble monomeric liquid composition comprising at least one polymerizable ethylenically unsaturated compound—other than amino compound—that is capable of undergoing additional polymerization to form substantially water insoluble addition polymers and (2) one or more $\alpha,\beta$-ethylenically unsaturated monomers, as defined below, which contain a carboxyl group (—COOH) and an aminoalcohol ester group (—CO$_2$ONHR''), i.e. the two kinds of groups may be present in a single monomeric species, such as both groups in the same monomer, or in individual monomers, such as the carboxyl group in one monomer and the aminoalcohol ester group in another monomer. Such latex products are stable cationic latexes which, when deposited on polar substrates and dried, provide films which have improved adhesion to such substrates. Preferably, however, the thus obtained latexes are converted to the anionic state by adding a non-ionic surfactant and adjusting the pH of the latex to a value greater than about 8, and usually greater than about 9; the amount of non-ionic surfactant being sufficient to stabilize the latex during the pH adjustment. The anionic latexes not only possess the desirable adhesive properties but are also compatible with conventional paint formulating ingredients.

The amino alcohol esters of $\alpha,\beta$-ethylenically unsaturated carboxylic acids whose salts are employed in the practice of the present invention are representable by the formulas

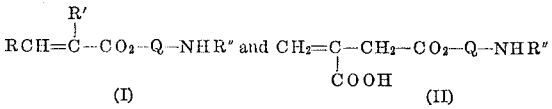

$$\text{RCH}=\overset{R'}{\underset{}{C}}-\text{CO}_2-\text{Q}-\text{NHR}'' \quad \text{and} \quad \text{CH}_2=\overset{}{\underset{}{C}}-\text{CH}_2-\text{CO}_2-\text{Q}-\text{NHR}''$$
$$\text{(I)} \qquad\qquad\qquad \underset{\text{COOH}}{} \text{(II)}$$

wherein the symbol R represents hydrogen, —CO$_2$H, or —CO$_2$—Q—NHR'', the symbol R' represents hydrogen, methyl, —CH$_2$—CO$_2$H, —CH$_2$—CO$_2$—Q—NHR'', or a halogen having an atomic number from 17 to 35, i.e., chlorine or bromine, and at least one of R and R' is hydrogen; the symbol Q represents an alkylene radical, i.e., a bivalent aliphatic hydrocarbon radical having from 2 to 3 carbon atoms and having its valence bonds on different carbon atoms; and the symbol R'' represents hydrogen, methyl or ethyl, the group —Q—NHR'' being a residue of an amino monohydric alcohol. Such amino alcohol esters are ones in which the amino group is a primary amino group or a secondary amino group.

When the substituent which is attached to an $\alpha$-carbon atom of an $\alpha,\beta$-ethylenically unsaturated aminoalcohol ester is hydrogen, even after polymerization there is some tendency in neutral or basic aqueous media for the aminoalcohol ester group to rearrange to an amido group which does not have the same adhesion promoting property possessed by the aminoalcohol ester group

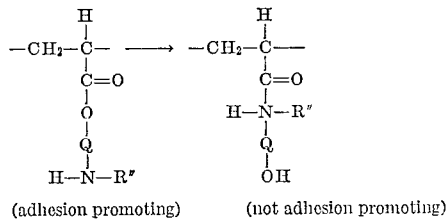

(adhesion promoting)    (not adhesion promoting)

While the practice of the invention is not bound by any theory of operation, it is thought that when the R' group is larger than hydrogen, steric hindrance obstructs the rearrangement. Thus, the preferred amino alcohol esters are those of Formula I, above, wherein R is hydrogen and R' is methyl or —CH$_2$COOH, and the other symbols have the same definitions as given hereinabove. Especially preferred is the aminoalcohol ester when R is hydrogen and R' is methyl, i.e. an aminoalcohol ester of methacrylic acid, because of ease of preparation, stability, and advantageous properties of the latex products prepared therefrom.

Amino alcohol esters of $\alpha,\beta$-ethylenically unsaturated monocarboxylic acids and amino alcohols in which the amino group has at least one covalently bonded hydrogen atom (i.e., a primary or secondary amino group), which amino group is not sterically hindered and is separated from the ester linkage by from 2 to 3 carbon atoms in an alkylene radical, are described in U.S. Pat. 3,108,979 issued to Walter J. Le Fevre and David P. Sheetz. Such esters are obtainable in accordance with that patent (and further reference therein) in the form of hydrohalide salts by interaction of an $\alpha,\beta$-ethylenically unsaturated carboxylic acid halide and a hydrohalide salt of an amino aliphatic alcohol.

The amino alcohol esters of the dicarboxylic acids may be prepared in the same manner. The amino alcohol half esters of dicarboxylic acids such as of maleic acid and itaconic acid are prepared by the interaction of the appropriate acid anhydride and a water-soluble salt of an amino alcohol ester. The amino alcohol half ester of fumaric acid may be prepared by first preparing the maleic half esters as noted above, followed by isomerization.

Specific examples of $\alpha,\beta$-ethylenically unsaturated carboxylic acids whose esters are contemplated in the practice of this invention are acrylic acid, methacrylic acid, $\alpha$-bromoacrylic acid, $\alpha$-chloroacrylic acid, maleic acid, fumaric acid, and itaconic acid. With the dicarboxylic acids, the ester may be a mono- or a di-ester.

Specific examples of amino alcohols whose esters are contemplated in the practice of this invention are 2-aminoethanol, 3-aminopropanol, 1-amino-2-propanol, 2-methylaminoethanol, 2-ethylaminoethanol, 3-methylaminopropanol, 3-ethylaminopropanol, 1-methylamino-2-propanol, 1-ethylamino - 2 - propanol, 2-amino-1-propanol, and 2-methylamino-1-propanol.

The terms "amino alcohol esters" and "amino alcohol esters of $\alpha,\beta$-ethylenically unsaturated carboxylic acids" employed herein designate esters of $\alpha,\beta$-ethylenically unsaturated carboxylic acids and amino monohydric alcohols according to the foregoing description.

In this specification, by the term "copolymerizable" is meant that the material to which the term is applied will interpolymerize under emulsion polymerization conditions.

In the practice of this invention, the amino alcohol esters of alpha,beta-ethylenically unsaturated carboxylic acids are employed in the form of their water soluble salts, preferably salts of the hydrogen halides, such as hydrochloric acid and hydrobromic acid, and salts of acids such as sulfuric acid and toluene sulfonic acid.

There is also required for the practice of this invention a carboxylic acid component. When the aminoalcohol ester component is a half ester of a dicarboxylic acid, the carboxylic component and the ester component may be provided by the single monomeric species. However, with the bisamino alcohol esters of dicarboxylic acids and with the amino alcohol esters of monocarboxylic acids, the carboxylic acid component is provided by an $\alpha,\beta$-ethylenically unsaturated aliphatic carboxylic acid. Generally, such carboxylic acids contain from 3 to 7 carbon atoms. The preferred polymerizable carboxylic acids are acrylic acid and methacrylic acid. However, other alpha-substituted acrylic acid such as those having substituents with from 2 to 4 carbon atoms are operable. Also, dicarboxylic acids having ethylenic unsaturation alpha-beta to at least one of the carboxyl groups may be used. Examples of such dicarboxylic acids are fumaric acid, maleic acid and itaconic acid.

Also required for the preferred embodiment of this invention is a non-ionic surfactant. Typical non-ionic emulsifiers (surfactants) are compounds formed by the reaction of an alkylene oxide, such as ethylene oxide, propylene oxide, or butylene oxide with long chain fatty alcohols, long chain fatty acids, alkylated phenols, long chain alkyl mercaptans, long chain alkyl primary amines, for example, cetylamine, the alkylene oxides being reacted in a ratio such as 5 moles to 20 moles or higher such as up to 50 moles per mole of the co-reactant. Similarly effective compounds are monoesters such as the reaction products of a polyethylene glycol with a long chain fatty acid, for example, glycerol monostearate, sorbitan trioleate, and partial and complete esters of long chain carboxylic acids with polyglycol ethers of polyhydric alcohols. By "long chain" in the above description is usually meant an aliphatic group having from six carbon atoms to 20 or more.

Optionally there may be used, in conjunction with non-ionic surfactants, a non-polymerizable cationic surfactant having a molecular weight less than about 500. Such non-polymerizable cationic surfactants include the classes of salts of aliphatic amines, especially the fatty amines, quaternary ammonium salts and hydrates, fatty amides derived from disubstituted diamines, fatty chain derivatives of pyridinium compounds, ethylene oxide condensation products of fatty amines, sulfonium compounds and phosphonium compounds. "Non-polymerizable" as used in the term "non-polymerizable cationic surfactant" is construed to mean that no significant polymerization of the surfactant occurs under the conditions employed in the art of emulsion polymerization.

Specific examples of the non-polymerizable cationic surfactants are dodecylamine acetate, dodecylamine hydrochloride, tetradecylamine hydrochloride, hexadecylamine acetate, lauryl dimethylamine citrate, octadecylamine sulfate, dodecylamine lactate, cetyl trimethyl ammonium bromide, cetyl pyridinium chloride, an ethanolated alkyl guanidine amine complex, stearyl dimethyl benzyl ammonium chloride, cetyl dimethyl amine oxide, stearamido propyl dimethyl-$\beta$-hydroxyethyl ammonium phosphate, cetyl dimethyl benzyl ammonium chloride, tetradecylpyridinium bromide, diisobutyl phenoxy ethoxy ethyl dimethyl benzyl ammonium chloride, 1-(2-hydroxyethyl)-2-(mixed pentadecyl and heptadecyl)-2-imidazoline, resin amine ethoxylate, oleyl imidazoline, octadecyl sulfonium methyl sulfate, benzyl dodecyl methyl sulfonium bromide and the like.

There are many other known polymerizable ethylenically unsaturated compounds that can be polymerized while dispersed in aqueous media by means already known per se to produce aqueous colloidal dispersions of substantially water-insoluble solid polymer products. These monomers of the class of styrene and monomers copolymerizable with styrene can now be advantageously polymerized in aqueous dispersions that comprise an α,β-ethylenically unsaturated aliphatic carboxylic acid and small amounts of one of the amino alcohol esters of the class defined above, to form a cationic latex which may be converted in the presence of a non-ionic emulsifier to an anionic latex by adjustment of the pH to above about 8, usually above about 9, in accordance with this invention.

Among such other known polymerizable ethylenically unsaturated monomers that are capable of undergoing addition polymerization to form water-insoluble addition polymers are the alkenyl aromatic compounds, i.e., the styrene compounds; the derivatives of α-methylene monocarboxylic acids such as the acrylic esters, acrylic nitriles and methacrylic esters; derivatives of α,β-ethylenically unsaturated dicarboxylic acids such as maleic esters; unsaturated alcohol esters; conjugated dienes; unsaturated ketones; unsaturated ethers; and other vinyl compounds such as vinyl chloride and vinylidene bromide. Specific examples of such ethylenically unsaturated compounds are styrene, α-methylstyrene, ar-methylstyrene, ar-ethylstyrene, α,ar-dimethylstyrene, ar,ar-dimethylstyrene, vinylnaphthalene, hydroxystyrene, methoxystyrene, cyanostyrene, acetylstyrene, monochlorostyrene, dichlorostyrene and other halostyrenes, divinylbenzene, methyl methacrylate, ethyl acrylate, butyl acrylate, hexyl acrylate, lauryl methacrylate, phenyl acrylate, acrylonitrile, methacrylonitrile, acrylanilide, ethyl α-chloroacrylate, ethyl maleate, polyglycol maleate, vinyl chloride, vinyl bromide, vinylidene chloride, vinylidene bromide, vinyl methyl ketone, methyl isopropenyl ketone, vinyl ethyl ether, 1,3-butadiene, isoprene and the like.

In this specification, the term "substantially water-insoluble" as applied to the other monomeric material, i.e., a monomer or mixture of monomers (excluding the copolymerizable ethylenically unsaturated amino alcohol esters and the α,β-ethylenically unsaturated carboxylic acids), means that less than about 0.5 part per 100 parts by weight of such monomeric material is soluble in 100 parts by weight of water.

The improved process of polymerization according to this invention comprises preparing an aqueous composition comprising a non-alkaline, e.g., neutral to acidic, aqueous medium, one or more of the class of the water-soluble salts of the amino alcohol esters of α,β-ethylenically unsaturated carboxylic acids, one or more alpha, beta-ethylenically unsaturated carboxylic acids, and one or more of the class of other polymerizable ethylenically unsaturated compounds that are capable of forming substantially water-insoluble addition polymers.

The invention contemplates that the aqueous starting composition comprising the polymerizable material may contain polymerization catalysts of kinds already known to promote emulsion polymerization. Among such catalysts are water-soluble oxidizing agents such as hydrogen peroxide and potassium persulfate and catalysts which like the redox catalysts are activated in the water phase, e.g. by a water soluble reducing agent. The preferred catalyst systems include, for example, the combination of hydrogen peroxide and ferric ions in an aqueous medium having a pH value not greater than 3 or the combination of an organic peroxide such as cumene hydroperoxide, and an activator such as sodium formaldehyde sulfoxylate. The acceptable catalysts are those which cause polymerization of ethylenic monomers, e.g. styrene, in aqueous media having a pH value of less than about 7. The starting compositions may include acids or salts to provide the desired pH value and possibly a buffered system.

The advantages of the present invention are attained with a starting aqueous composition comprising a monomeric mixture containing an α,β-ethylenically unsaturated amino alcohol ester component and an α,β-ethylenically unsaturated carboxylic acid component as one or more monomeric species, i.e. both components may be present in one monomeric species, together with one or more substantially water insoluble ethylenically unsaturated monomers which are capable of undergoing addition polymerization. The amino alcohol ester component and the carboxylic component are used in such amounts that the ratio of the number of —NHR" groups to the number of —COOH groups is less than about 2. The monomer or monomers containing the carboxylic acid group (—COOH) are used in such an amount as to provide from about 0.26 percent to about 5.2 percent, preferably from about 0.52 percent to about 2.6 percent, by weight of carboxylic acid groups. The amino alcohol ester is used in such an amount as to provide a nitrogen content of from about .0085 percent to about 0.85 percent, preferably from about 0.021 percent to about 0.34 percent, by weight. The above calculations and percentages are based on the total weight of the polymerizable constituents.

Optionally the starting aqueous composition may contain a small amount of a cationic non-polymerizable surfactant having a molecular weight of less than about 500. A non-ionic surfactant may also be present during polymerization provided the material is selected from those which are not antagonistic to the polymerization procedure.

The other non-polymerizable constituents of the starting composition can be employed in the usual proportions already known in this art, for example, the starting aqueous composition usually contains from about 5 to 60 percent by weight of the polymerizable constituent, and correspondingly from about 95 to 40 percent by weight of the aqueous medium, although proportions outside of these ranges can be used.

The starting composition as described above is subjected to conditions conductive to polymerization of the polymerizable constituents. In most instances the starting composition is agitated and the temperature is raised, e.g., temperature in the range from 40° to 100° C., to activate the polymerization; although, in some instances, particularly those wherein the composition comprises a very active polymerization catalyst, the polymerization can occur at or below room temperature. Other means such as exposure of the composition to activating radiations can be employed to promote the polymerization of polymerizable constituents.

The invention contemplates embodiments in which all of the constituents are charged with the starting mixture and are polymerizable in the single step, as well as embodiments in which the constituents are charged in a sequence, perhaps coordinated with the polymerization sequence, and/or the polymerization is carried out in a plurality of stages. The amino alcohol esters of the unsaturated carboxylic acids can advantageously be added to the polymerization reaction mixture prior to the polymerization step or any time prior to the complete polymerization of the polymerizable constituents.

The products obtained by the above procedure are stable cationic latexes which provide films having good wet and dry adhesion when applied to polar substrates.

The cationic latex products are readily converted when desired into stable anionic latexes by adding (if such was not added during or prior to polymerization of the monomeric constituents) a sufficient amount of a non-ionic surfactant, usually from about 1 percent to about 6 percent by weight based on the weight of the polymer in the latex, to stabilize the latex during the subsequent adjustment of the pH of the composition to a value greater than 8 and usually from 9 to 10, preferably by the addition of ammonium hydroxide, although alkali metal hydroxides and organic bases such as morpholine may be used if desired. Nevertheless, in order that the cationic latex intermediate can be converted to an adequately stable anionic latex, the polymer composition must have the carboxyl substituent (provided as hereinbefore described) which is converted to a salt by the pH adjustment. Optionally, conventional anionic surfactants may be added to the anionic latexes. The anionic latexes thus obtained are compatible with the conventional formulating ingredients which have been developed in the prior art for use with previously known anionic latexes to produce coating and impregnating compositions. However, the products of this invention contribute improved wet and dry adhesion to dried film compositions or coating compositions prepared therefrom.

Thus, the latex products, i.e., aqueous polymer dispersions, obtained in accordance with this invention, are useful for a number of purposes. For example, the latex dispersions are useful as, or in the preparation of, coating and impregnating compositions and the coating of films and the like. They are especially advantageous for the preparation of paints and other coatings where adhesion to a polar substrate is desired, such as in paper coatings, fabric coatings and the like.

An aqueous dispersion paint prepared from the latex hereinbefore described by admixture with the formulation comprising a paint pigment is included within the concept of this invention. Such paint pigments include for example, titanium dioxide (rutile and/or anatase), lithopone, zinc oxide, mica, China clay, barium sulfate, calcium carbonate, dolomite, calcium silicate, diatomaceous earth, iron oxide, chromic oxide, carbon black, sienna, umber, ochre, and Prussian blue. Usually a water dispersion of the pigment is first prepared then the latex is blended with the dispersion. Typical materials included in the aqueous emulsion paint formulations are wetting and dispersing agents such as polyphosphates, pyrophosphates, anionic and non-ionic surfactants, and polyvinyl alcohol; thickeners and pigment stabilizers such as sodium carboxymethyl cellulose, methyl cellulose, alginates and proteins; coalescing solvents such as butoxyethyl acetate, toluene and xylene; pH adjustors such as ammonia, bicarbonates, carbonates and phosphates; defoamers such as silicones, tributylphosphate, pine oil and ethylene oxide condensates; freeze-thaw stabilizers such as ethylene glycol and diethylene glycol; and preservatives such as phenyl mercuric compounds, e.g., phenyl mercuric acetate and phenyl mercuric oleate.

Having generally described the features of this invention, the following examples are given to illustrate more fully to those skilled in the art, the practice of this invention without intending any limitations thereby. All parts and percentages are by weight unless otherwise indicated.

EXAMPLE 1

A solution was prepared from the following ingredients: 1775 milliliters of water; 20 grams of a 10 percent aqueous solution of dodecyl amine hydrochloride; 90 grams of a 9.5 percent aqueous solution of 2-aminoethyl methacrylate hydrochloride; and 3 parts per million of ferric ion as ferric nitrate. The solution was adjusted to a pH of 2.5 by the addition of hydrochloric acid. Then a solution containing 120 grams of n-butyl acrylate and 80 grams of methyl methacrylate was added. The resulting mixture was agitated by stirring under a nitrogen blanket at 70° C., then 13.2 milliliters of a 35 percent aqueous solution of hydrogen peroxide was added after an additional stirring period of 15 minutes at 70° C. A continuous addition sequence was begun of a solution containing 1200 grams of ethyl acrylate, 560 grams of methyl methacrylate, and 40 grams of methacrylic acid. The constant rate of addition was such that a 4 hour period was required for completion. After one, two and three hours of the addition process, respectively, a 30 gram portion of a 9.5 percent aqueous solution of aminoethyl methacrylate hydrochloride was added; agitation by stirring at 70° C. was continued for 1 hour after the last addition of monomer. The product obtained thereby was an aqueous colloidal dispersion of a polymer, i.e., a latex, having 50.5 percent solids and an average particle diameter of 1480 angstroms. To the latex was added with stirring in an amount equal to 2% by weight, based on the copolymer in the latex, of a non-ionic surfactant which is the reaction product of nonylphenol and ethylene oxide in the mole ratio of 1 to 20. Sufficient concentrated ammonium hydroxide was then added to raise the pH of the composition to 9.

For the ethyl acrylate, methyl methacrylate and the n-butyl acrylate of Example 1 there may be substituted styrene and butadiene, or styrene and an alkyl acrylate, e.g. n-butyl acrylate, with substantially the same results. Comparable results are also obtained when for the methacrylic acid in Example 1, there is substituted acrylic acid, fumaric acid, itaconic acid, maleic acid, or a mixture of any two or more thereof.

EXAMPLE 2

A paint was prepared from the latex of Example 1 according to the following formulation:

First portion

| | Percent |
|---|---|
| Water | 19.70. |
| Dispersant [1] | .63. |
| Titanium dioxide, rutile | 16.11. |
| Mica, 325 mesh | 2.68. |
| Calcium carbonate | 8.95. |
| Clay | 4.03. |
| Ethylene glycol | 1.34 ⎱ |
| Polypropylene glycol (molecular weight 1200) | .18 ⎰ Pre-blended. |
| Methyl cellulose, 4000 cps. | .36 ⎱ |

Second portion

| | |
|---|---|
| Latex (adjusted to 47 percent of solids) | 43.86. |
| Antifoam agent [2] | .90. |
| Preservative, a phenyl mercurial | .54. |
| Non-ionic wetting agent (50 percent in ethanol) [3] | .72. |

[1] The sodium salt of a diisobutylene/maleic anhydride copolymer at 25 percent concentration.
[2] Predominantly a salt of a sulfated fatty acid at 60 percent solids concentration mixed with water in ratio of 1:1.
[3] Emcol 5138, an alkanolamine fatty acid condensate.

Portion 1 was ground in high speed dispersing equipment before portion 2 was blended with it. The resulting paint had a pigment volume concentration of 35 percent and a Stormer viscosity of 85–90 K.U. at 25° C.

EXAMPLE 3

A latex was prepared by the procedure of Example 1, except that no cationic emulsifier, i.e., no dodecylamine hydrochloride, was used and the amount of 2-aminoethyl methacrylate hydrochloride was equal to 0.475% of the total weight of the monomers. From the resulting latex a paint was prepared according to the method of Example 2. The paint was tested for wet adhesion in the manner hereinafter described and the results are shown in Table 1.

EXAMPLE 4

A latex was prepared as in Example 3, except that the amount of the 2-aminoethyl methacrylate hydrochloride was 0.29 percent of the weight of the monomers and additionally dimethyl aminoethyl methacrylate hydrochloride in an amount of 0.50 percent was used instead of the dodecylamine hydrochloride. Results of the wet adhesion test are also shown in Table 1 below.

EXAMPLE 5

A latex was prepared according to the method of Example 1 from 28 percent by weight of alpha-methyl styrene, 70 percent by weight of n-butyl acrylate and 2 percent by weight of methacrylic acid, except that the amount of the 2-amino ethyl methacrylate hydrochloride was 0.70 percent and the dodecyl amine hydrochloride was 0.15 percent by weight based on the total weight of the monomers. A paint was prepared from the latex according to the method of Example 2. The results of the wet adhesion test are included in Table 1 below.

For comparison with the above examples of the invention other latexes, not examples of the invention which were designated latex X and latex Y for identification purposes, were prepared by the method and ingredients of Example 1, except that for latex X, 2 percent by weight of dimethylamino ethyl methacrylate hydrochloride was used instead of the 2-amino ethyl methacrylate hydrochloride and the dodecyl amine hydrochloride; in latex Y, 0.9 percent of dodecyl amine acetate was substituted for the 2-amino ethyl methacrylate hydrochloride and the dodecylamine hydrochloride. Paints were also prepared from latex X and latex Y according to the method of Example 2 and the wet adhesion results are included in Table 1 below.

TABLE 1.—PAINT ADHESION TEST

| | Emulsifiers used in preparation of the latex | | | | |
|---|---|---|---|---|---|
| | Copolymeric | | Conventional | | |
| Latex | Kind | Amount [1] (percent) | Kind | Amount [1] (percent) | Adhesion |
| Example 1 | AEM·HCl [2] | 0.85 | Dodecylamine·HCl | 0.1 | Excellent. |
| Example 3 | AEM·HCl | 0.475 | | | Good. |
| Example 4 | {AEM·HCl<br>{DMAEM·HCl [3] | 0.29<br>0.50 | | | Do. |
| Example 5 | AEM·HCl [2] | 0.70 | Dodecylamine·HCl | 0.15 | Excellent. |
| Latex X [4] | DMAEM·HCl [3] | 2.0 | | | Poor. |
| Latex Y [4] | | | Dodecylamine·acetate | 0.9 | Do. |

[1] Based on weight of the copolymer in the latex.
[2] 2-aminoethyl methacrylate hydrochloride.
[3] Dimethylaminoethyl methacrylate hydrochloride.
[3] Dimethylaminoethyl methacrylate hydrochloride.
[4] Not examples of this invention.

EXAMPLE 6

A solution was prepared from 480 milliliters of water, 1 gram of di-isobutyl phenoxy ethoxy ethyl dimethylbenzyl ammonium chloride, 5 grams of 2-aminoethyl acid maleate hydrochloride and 10 milliliters of an aqueous solution containing 10 parts per million of ferric ion. To the resulting solution was added 100 grams of styrene and 8.6 milliliters of a 35 percent aqueous solution of hydrogen peroxide and the mixture obtained thereby was heated with stirring at 70° C. for 1½ hours. Continuous addition of an additional quantity of 425 grams of styrene then was begun and five minutes later a solution of 5.5 grams of 2-aminoethyl acid maleate hydrochloride was added. About 1¾ hours was required for the addition of the styrene. Stirring was continued for an additional 15 minutes at the same temperature (70° C.). There was obtained by the procedure a stable cationic latex having a particle size of 0.175 micron and a solids content of 49 percent.

The paint adhesion tests were carried out by a standardized procedure as follows: a coat of the latex paint is brushed onto a standard primer, e.g. an alkyd primer, which has been coated previously onto a wood substrate. After the first coat of latex paint has dried for 1 day, a second coat is brushed on and allowed to dry for 5 days. Water is then applied to a portion of the surface and is prevented from evaporating by covering with a watch glass. At intervals, starting after about 5 minutes, the watch glass is lifted and a steel spatula is used to pick at the surface to detect delamination. A specimen which begins to delaminate within a period of 5 to 10 minutes is rated as poor. A specimen which shows barely detectable delamination after 1 hour is rated as good, whereas a specimen which gives no evidence of delamination after 1 hour is rated as excellent.

What is claimed is:

1. A method for producing a stable latex comprising the steps of forming an aqueous dispersion of polymerizable ethylenically unsaturated material by mixing together constituents consisting essentially of water, polymerization catalyst, monomeric material, and pH adjusting materials to adjust the pH to a value below about 7; and polymerizing the monomeric material by maintaining the resulting dispersion at polymerization temperatures between about room temperature and about 100° C.; whereby there is obtained a cationic latex; adding a water-soluble base-acting compound to the cationic latex and adding a non-ionic surfactant between the time of formation of the aqueous dispersion of the polymerizable material and the addition of the water-soluble base-acting compound, whereby there is formed a stable anionic latex; the amount of said non-ionic surfactant being sufficient to stabilize the latex during the addition of the base-acting compound, the amount of said base-acting compound being sufficient to raise the pH to a value greater than about 8; and said monomeric material consisting essentially of (1) a monomeric composition selected from the class consisting of
(a) a water soluble salt of a monohydric aminoalcohol half ester of an $\alpha,\beta$-ethylenically unsaturated dicarboxylic acid,
(b) a mixture of an $\alpha,\beta$-ethylenically unsaturated carboxylic acid having from 3 to 7 carbon atoms and a monohydric aminoalcohol diester of an $\alpha,\beta$-ethylenically unsaturated dicarboxylic acid,
(c) a mixture of an $\alpha,\beta$-ethylenically unsaturated carboxylic acid having from 3 to 7 carbon atoms and a monohydric aminoalcohol ester of an $\alpha,\beta$-ethylenically unsaturated monocarboxylic acid and
(d) a mixture of (a) and an $\alpha,\beta$-ethylenically unsaturated carboxylic acid having from 3 to 7 carbon atoms; each of said monohydric aminoalcohol esters having at least one covalently bonded hydrogen on the amino nitrogen atom, and the amount of said aminoalcohol ester being sufficient to provide from about 0.0085 percent to about 0.85 percent by weight of nitrogen; the amount of the $\alpha,\beta$-ethylenically unsaturated acid being sufficient to provide from about 0.26 percent to about 5.2 percent by weight of carboxylic acid groups; all percentages being based on the total weight of the monomeric material; and
(2) at least one other polymerizable ethylenically unsaturated monomer; said other monomer being substantially water-insoluble and being capable of undergoing addition polymerization to form water-insoluble polymers.

2. The method of claim 1 wherein the pH which is below about 7 also is below about 3.5.

3. The method of claim 1 wherein the monomeric material consists essentially of
(1) a water-soluble salt of 2-aminoethyl methacrylate,
(2) an $\alpha,\beta$-ethylenically unsaturated carboxylic acid having from 3 to 7 carbon atoms and
(3) at least one other polymerizable ethylenically unsaturated monomer; said other monomer being substantially water insoluble and being capable of undergoing addition polymerization to form water-insoluble polymers.

4. A method for producing a stable latex comprising the steps of forming an aqueous dispersion of polymerizable ethylenically unsaturated material by mixing together constituents consisting essentially of water, polymerization catalyst, monomeric material, and pH adjusting materials to adjust the pH to a value below about 7; and polymerizing the monomeric material by maintaining the resulting dispersion at polymerization temperatures between about room temperature and about 100° C.; whereby there is obtained a cationic latex; adding a water-soluble base-acting compound to the cationic latex and adding a non-ionic surfactant between the time of formation of the aqueous dispersion of the polymerizable material and the addition of the water-soluble base-acting compound, whereby there is formed a stable anionic latex; the amount of said non-ionic surfactant being sufficient to stabilize the latex during the addition of the base-acting compound, and the amount of said base-acting compound being sufficient to raise the pH to a value greater than about 8; said monomeric material consisting essentially of (1) a monomeric composition selected from the class consisting of (a) a water-soluble salt of an aminoalcohol ester selected from the class consisting of $$HO_2C-CH=CH-CO_2-Q-NHR''$$

and

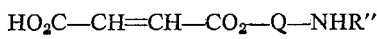

wherein Q is a bivalent aliphatic hydrocarbon radical having from 2 to 3 carbon atoms and having its valence bonds on different carbon atoms and R'' is selected from hydrogen, methyl and ethyl;

(b) a mixture of an $\alpha,\beta$-ethylenically unsaturated carboxylic acid having from 3 to 7 carbon atoms and an aminoalcohol ester selected from the class consisting of

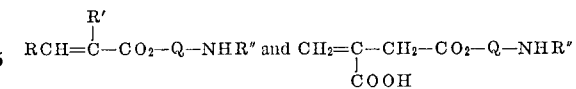

wherein R is selected from hydrogen, $-CO_2H$ and $-CO_2-Q-NHR''$, R is selected from hydrogen, methyl, $-CH_2-CO_2H$, $-CH_2-CO_2-Q-NHR''$, chlorine and bromine, and Q and R'' are as defined above; and the amount of said aminoalcohol ester being sufficient to provide from about 0.0085 percent to about 0.85 percent by weight of nitrogen; the amount of the $\alpha,\beta$-ethylenically unsaturated acid being sufficient to provide from about 0.26 percent to about 5.2 percent by weight of carboxylic acid groups; all percentages being based on the total weight of the monomeric material; and (2) at least one other polymerizable ethylenically unsaturated monomer; said other monomer being substantially water-insoluble and being capable of undergoing addition polymerization to form water-insoluble polymers.

5. The method of claim 4 wherein the pH which is below about 7 also is below about 3.5.

References Cited

UNITED STATES PATENTS

| | | | |
|---|---|---|---|
| 2,838,397 | 6/1958 | Gruntfest et al. | 260—89.57 |
| 3,108,979 | 10/1963 | Le Fevre et al. | 260—29.6 |
| 3,261,796 | 7/1966 | Simms | 260—29.6 |

FOREIGN PATENTS

| | | | |
|---|---|---|---|
| 475,131 | 11/1937 | Great Britain | 260—89.5 N |

MURRAY TILLMAN, Primary Examiner

H. ROBERTS, Assistant Examiner

U.S. Cl. X.R.

117—148, 155 UA, 161 UT, 161 UZ; 260— 29.6 R, 29.6 HN, 29.6 H, 29.7 H, 29.7 T, 41 A, 41 B, 41 O, 80.73, 86.1 N

UNITED STATES PATENT OFFICE
CERTIFICATE OF CORRECTION

PO-1050 (5/69)

Patent No. 3,637,565  Dated 25 January 1972

Inventor(s) David P. Sheetz

It is certified that error appears in the above-identified patent and that said Letters Patent are hereby corrected as shown below:

Column 2, line 31, change "($-CO_2ONHR$")," to --($-CO_2QNHR$"),--.

Column 12, line 8, change "R is" to --R' is--.

Signed and sealed this 1st day of August 1972.

(SEAL)
Attest:

EDWARD M. FLETCHER, JR.
Attesting Officer

ROBERT GOTTSCHALK
Commissioner of Patents